US006202827B1

(12) United States Patent
Drewitz

(10) Patent No.: US 6,202,827 B1
(45) Date of Patent: Mar. 20, 2001

(54) METHOD AND APPARATUS FOR FEEDING CONTAINERS IN SERIAL ORDER ON A CONVEYOR BELT

(75) Inventor: Hugues Drewitz, St-Eustache (CA)

(73) Assignee: Kalish Canada Inc., Montreal (CA)

(*) Notice: Subject to any disclaimer, the term of this patent is extended or adjusted under 35 U.S.C. 154(b) by 0 days.

(21) Appl. No.: 09/183,269

(22) Filed: Oct. 30, 1998

Related U.S. Application Data

(60) Provisional application No. 60/065,263, filed on Oct. 31, 1997.

(51) Int. Cl.[7] .................................................. B65G 47/26
(52) U.S. Cl. ............................................................ 198/433
(58) Field of Search ............................................. 198/433

(56) References Cited

U.S. PATENT DOCUMENTS

| | | |
|---|---|---|
| 2,587,959 | 3/1952 | Biner . |
| 2,687,797 | 8/1954 | Hirsch et al. ................... 198/433 |
| 3,179,231 | 4/1965 | Craig . |
| 3,429,416 | 2/1969 | Provost et al. . |
| 3,557,932 * | 1/1971 | Laub, III ........................ 198/433 |
| 4,413,720 * | 11/1983 | Pfleger ............................ 198/433 |
| 4,610,347 | 9/1986 | Inoko . |
| 4,724,947 | 2/1988 | Opperthauser ................. 198/433 |
| 4,732,256 | 3/1988 | Dorner . |
| 4,932,190 | 6/1990 | Bergner et al. . |
| 5,069,594 | 12/1991 | Bott et al. ...................... 198/433 |
| 5,277,294 | 1/1994 | Sherepa et al. ................ 198/429 |

FOREIGN PATENT DOCUMENTS

| | | |
|---|---|---|
| 3637252 | 6/1987 | (DE) . |
| 0 299 346 | 1/1989 | (EP) . |
| 1 415 854 | 11/1975 | (GB) . |
| 1684171 | 10/1991 | (SU) . |

* cited by examiner

*Primary Examiner*—Robert P. Olszewski
*Assistant Examiner*—Bryan Jaketic
(74) *Attorney, Agent, or Firm*—Ratner & Prestia

(57) ABSTRACT

System for feeding empty containers on a conveyor belt, namely for packaging installations, such as bottling plants. The system for feeding containers comprises a supporting surface having dimensions sufficient to accommodate a multitude of empty containers placed side by side. This supporting surface continuously moves the containers against an abutment wall. The movement of the supporting surface causes empty containers to agglomerate against the abutment wall. A pushing device is provided to selectively push out from the containers agglomeration a number of containers over a secondary conveyor belt that will lead those containers to successive processing stations, such as a filling station, capping station, labeling station etc. The pushing device is mounted relative to the supporting surface such that it moves generally parallel to the abutment wall. The movement of the pushing device pushes out of the agglomeration a row of containers that are maintained in a serial order during this movement by the abutment wall on one hand and the rest of the empty containers on the other hand.

8 Claims, 5 Drawing Sheets

METHOD AND APPARATUS FOR FEEDING CONTAINERS IN SERIAL ORDER ON A CONVEYOR BELT

This application claim benefit to provisional application No. 60/065,263 filed Oct. 31, 1997.

FIELD OF THE INVENTION

The present invention relates to the art of materials handling, more particularly to an apparatus for feeding empty containers to a system for transporting those containers through various processing stations, such as a filling station, packaging station, labeling station etc.. The apparatus in accordance with the present invention is simple, inexpensive yet highly efficient and reliable.

BACKGROUND OF THE INVENTION

Manufacturers of consumer products packaged in bottles, glass or plastic containers, such as drugs, cosmetics or edible substances, make extensive use of automatic machinery to fill empty containers with the appropriate contents, cap the containers, apply a label, etc. A typical container processing line comprises a plurality of processing stations performing specific operations on containers dispensed in succession from a supply bin. Usually, the containers in the supply bin, are in a completely random disposition, hence a container orienting apparatus is required to first unscramble and then feed the containers to the processing line in a serial uniform spacing order. Glass containers cannot be put in a supply bin like other containers, the unscrambling operation would simply break the glass containers. These glass containers are normally packaged in boxes with compartments for each containers and must be handle very gently by feeding apparatus.

Existing devices for feeding containers to a conveyor belt suffer from numerous drawbacks, namely inefficiency, slow speed and undue complexity. Some devices can only feed containers in rows parallel to the direction of travel of the receiving conveyor belt. In most cases, round containers cannot be fed in an orderly fashion due to the fact that they are likely to overlap between rows and be improperly aligned. Often, without proper control of the container feeding action, the containers will remain randomly positioned when entering the receiving conveyor belt. Often transfer from one conveyor belt to the next without proper guidance creates an area where containers are only half engaged on the receiving conveyor belt resulting in random orientation of the containers and even toppling over of a container causing an interruption of the container feeding sequence.

Considering the popularity of this type of feeding apparatus, there is a strong demand for a feeding apparatus that is fast, efficient, simple and better adapted to fragile containers and to severe conditions.

OBJECT AND STATEMENT OF THE INVENTION

An object of the present invention is to provide a novel apparatus for feeding containers in serial order to a conveyor belt or any other container transporting mechanism, that is simple in construction, can operate at reasonably high speed, is relatively compact and is also reliable.

It is another object of the invention to provide an apparatus for feeding containers that can feed containers in rows in any direction of travel of the receiving conveyor belt.

It is yet another object of the invention to provide an apparatus for feeding containers that can feed round containers in an orderly fashion and in proper alignment.

It is yet another object of the invention to provide an apparatus for feeding containers that properly controls the container feeding action so that the containers will remain positioned in an orderly fashion when entering the receiving conveyor belt.

It is yet another object of the invention to provide an apparatus for feeding containers that insures proper engagement of containers on the receiving conveyor belt resulting in proper orientation of the containers.

It is yet another object of the invention to provide an apparatus for feeding containers that prevents toppling over of a container and interruption of the container feeding sequence.

As embodied and broadly described herein the invention provides an apparatus for feeding- containers in serial order to a container transporting device, said apparatus including:
  a container supporting surface dimensioned to receive and support a population of containers disposed in a multi-column and multi-row arrangement;
  means for displacing said population in a given direction;
  an abutment wall extending generally across said container supporting surface, said abutment wall being engaged by the population of containers when tending to move along said given direction;
  an outlet passageway adjacent said abutment wall for discharging selected members of the population of containers;
  a container pushing device located in the vicinity of said abutment wall, said container pushing device being movable along said abutment wall for engaging one member of the population of containers and causing displacement of the row of containers adjacent said abutment wall toward said outlet passageway whereby the members of the population of containers egress said outlet passageway in single file and at a rate which can be controlled by said container pushing device.

Advantageously, the apparatus for feeding containers further comprises a second abutment wall extending generally across said container supporting surface, said second abutment wall movable between an at rest position and an operating position, whereby in the operating position, said second abutment wall is down between two rows of containers, separating and guiding said containers through said outlet passageway and in said at rest position, said second abutment wall is removed from the containers flow to let a new row of container through. This second abutment wall provides a complementary guiding means to ensure that containers with a circular shape may egress said outlet passageway smoothly.

Advantageously, the apparatus for feeding containers comprises a conveyor belt on which the population of empty containers is placed. The abutment wall is a barrier or any suitable supporting structure extending across the conveyor belt such as to prevent the population of containers from moving beyond the boundary constituted by this barrier. When the conveyor belt is operating, it displaces the population of containers forward until they engage the abutment wall. At this point, the abutment wall causes the containers to slip on the surface of the conveyor belt, thus keeping the containers in place while allowing the conveyor belt to move forward. This particular arrangement allows replenishing the population of containers regularly to prevent depletion as a result of regular container removal. Thus, it suffices to deposit on the conveyor belt empty containers, preferably at a rate equal or slightly exceeding the rate of container removal from the population. Those fresh empty containers will be transported by the conveyor belt toward the abutment wall and will be agglomerated there with the remainder of the container population.

The dimensions of the conveyor belt are such as to allow the establishment of a multi-row, multi-column array of containers. In a very specific example, the transverse dimension of the conveyor belt that determines the number of columns of the array may be in the range of 20 to 60. The parameter that regulates the number of rows in the array is primarily the speed of the conveyor belt and the rate at which fresh containers are being deposited thereon. Indeed, the larger the deposition rate and the greater the speed, the faster the rows of the array will build up. This factor should also take into consideration the rate of container removal from the population. Thus, in absolute terms what should be considered is the differential rate between the containers that are being supplied and those removed in order to establish how fast the population will build up.

The means for displacing the population of empty containers toward the abutment wall may be any mechanical system suitable to accomplish this task. This means is preferably executed by the conveyor surface itself in combination with a drive motor that causes this surface to advance, hence tending to move the population of empty containers forward. Other possible embodiments exist, however. For example, the supporting surface on which the population of empty containers rests may be stationary. An arrangement of mechanical actuators may be provided to displace or tend to displace the population of empty containers over this stationary surface toward the abutment wall.

The container pushing device mentioned in the above definition of the invention is, in a preferred embodiment, a piston/cylinder assembly that is mounted above and substantially parallel to the abutment wall. Attached to the piston/cylinder assembly is a pushing member extending down to the surface of the conveyor belt. The orientation of the piston/cylinder assembly is such that when displacement occurs, the pushing member travels across the surface of the conveyor belt, parallel to the abutment wall. In use, when the piston/cylinder assembly is actuated, the pushing member engages a row of containers which are forced out of the population through the outlet passageway. During this movement, the row of containers is maintained aligned and guided on both sides to ensure that a precise number of containers will be pushed out through the outlet passageway, depending on the stroke of the piston/cylinder assembly. This guiding function is effected by the abutment wall on one side and by the remainder of the population on the other side.

In a variant, the container pushing device is a piston/cylinder assembly that is mounted adjacent the abutment wall. The orientation of the piston/cylinder assembly is such that when the piston rod is extended, it travels across the surface of the conveyor belt, parallel to the abutment wall. In use, when the piston rod is extended, it engages a row of containers which are forced out of the population through the outlet passageway.

The ability of the population of containers to maintain a guiding function against the forwardmost row of containers that is being extracted by the pushing member is primarily dependent on the shape of the containers and on the pressure that those containers can exert against this forwardmost row. The pressure can be controlled by varying the speed of the conveyor belt or generally, ensuring that the population of containers is constantly urged against the abutment wall. The shape of the containers is critical in the guiding function of the population of containers; a square shape being ideal because the flat surfaces of the containers slide against each other and containers of the following row do not have the tendency to catch their edges with the containers of the forwardmost row and interfere with the movement of the latter. Generally, once some pressure has been applied to the forwardmost row, the conveyor is stopped and backed up a short distance to relieve the pressure on the containers of the forwardmost row so that it is easier for the piston/cylinder assembly to push the forwardmost row. Another factor that also has an impact on the ability of the containers to guide the forwardmost row is the population size. The larger the number of containers placed on the conveyor belt, the more positive this guiding function will be. Thus, during the operation of the apparatus, it is considered good practice to maintain a significant number of empty containers on the conveyor belt to ensure that the mass of containers urged against the abutment wall will positively guide the forwardmost row that is being pushed out by the pushing member.

For round containers, a second abutment wall is preferably added to keep the containers in straight line and to prevent containers from the adjacent row from interfering with the exiting motion of the forwardmost row as it is being pushed. The second abutment wall comes down much like a guillotine to separate the rows of round containers and goes up to clear the conveyor surface and let the next row advance to the abutment wall.

Regulating the amount of working fluid injected into the piston/cylinder controls the movement of the pushing member. Generally speaking, two elements may be controlled, namely the stroke and the rate at which the piston/cylinder assembly is displaced. The total stroke will determine the number of containers that can be pushed out of the population during a single container ejection cycle. On the other hand, the rate of displacement determines the number of containers per unit of time that will egress the outlet passageway. The last parameter is probably more important since it determines the number of containers deposited on the conveyor belt that will be transporting those containers through the various processing stations, per unit of time. To increase the versatility of the apparatus, the rate of displacement of the piston/cylinder assembly should be adjustable to suit the speed of the conveyor belt designed to receive the empty containers from the outlet passageway. Such adjustability may be effected by any suitable mechanism that can vary the rate at which working fluid is being introduced in the piston cavity.

Other objects and features of the invention will become apparent by reference to the following description and the drawings.

Figure 1:
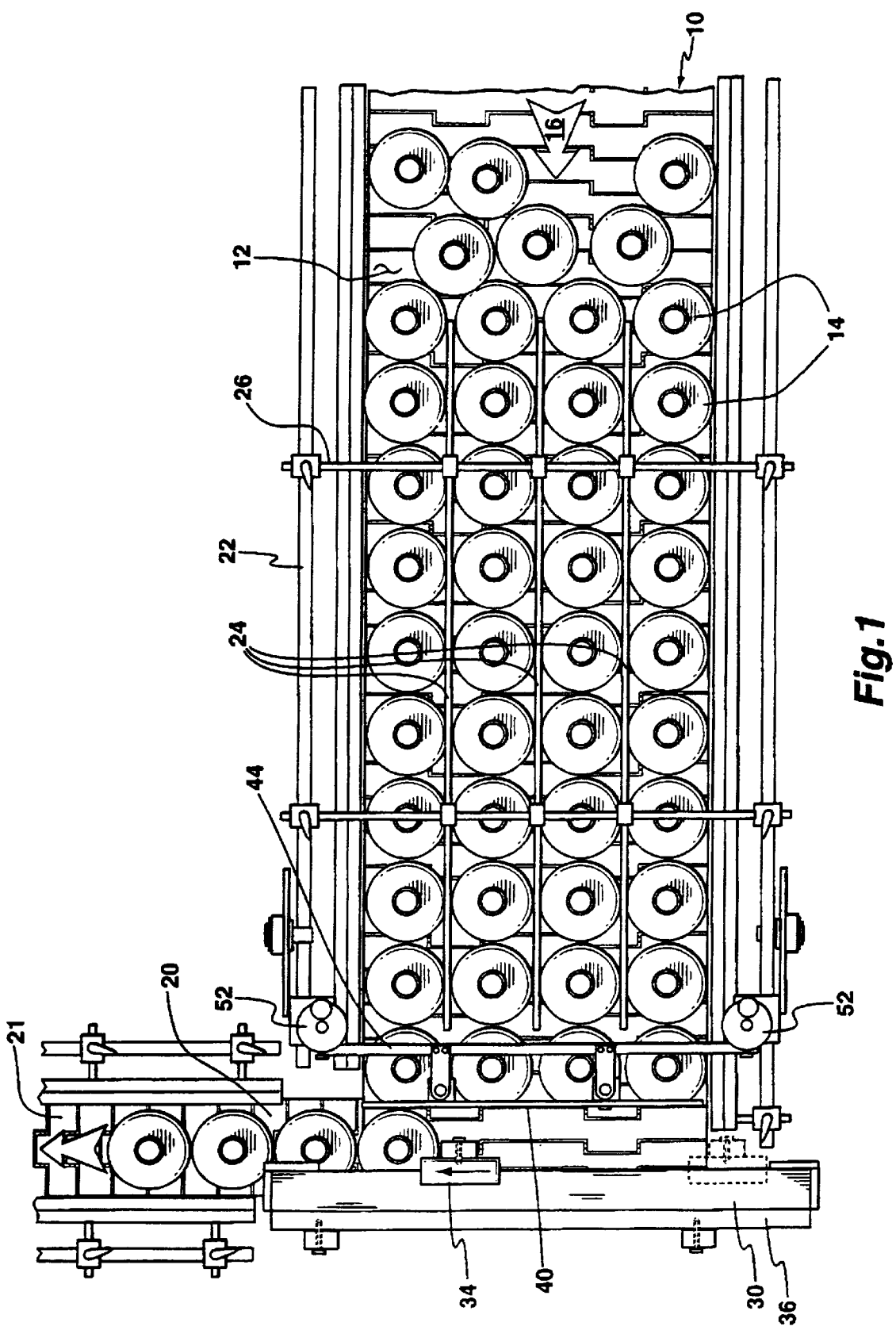
FIG. 1 is a top plan view of a container feeding system constructed in accordance with the present invention handling generally round containers.

In the drawings, preferred embodiments of the invention are illustrated by way of examples. It is to be expressly understood that the description and drawings are only for the purpose of illustration and are an aid for understanding. They are not intended to be a definition of the limits of the invention.

DESCRIPTION OF A PREFERRED EMBODIMENT

Figure 2:
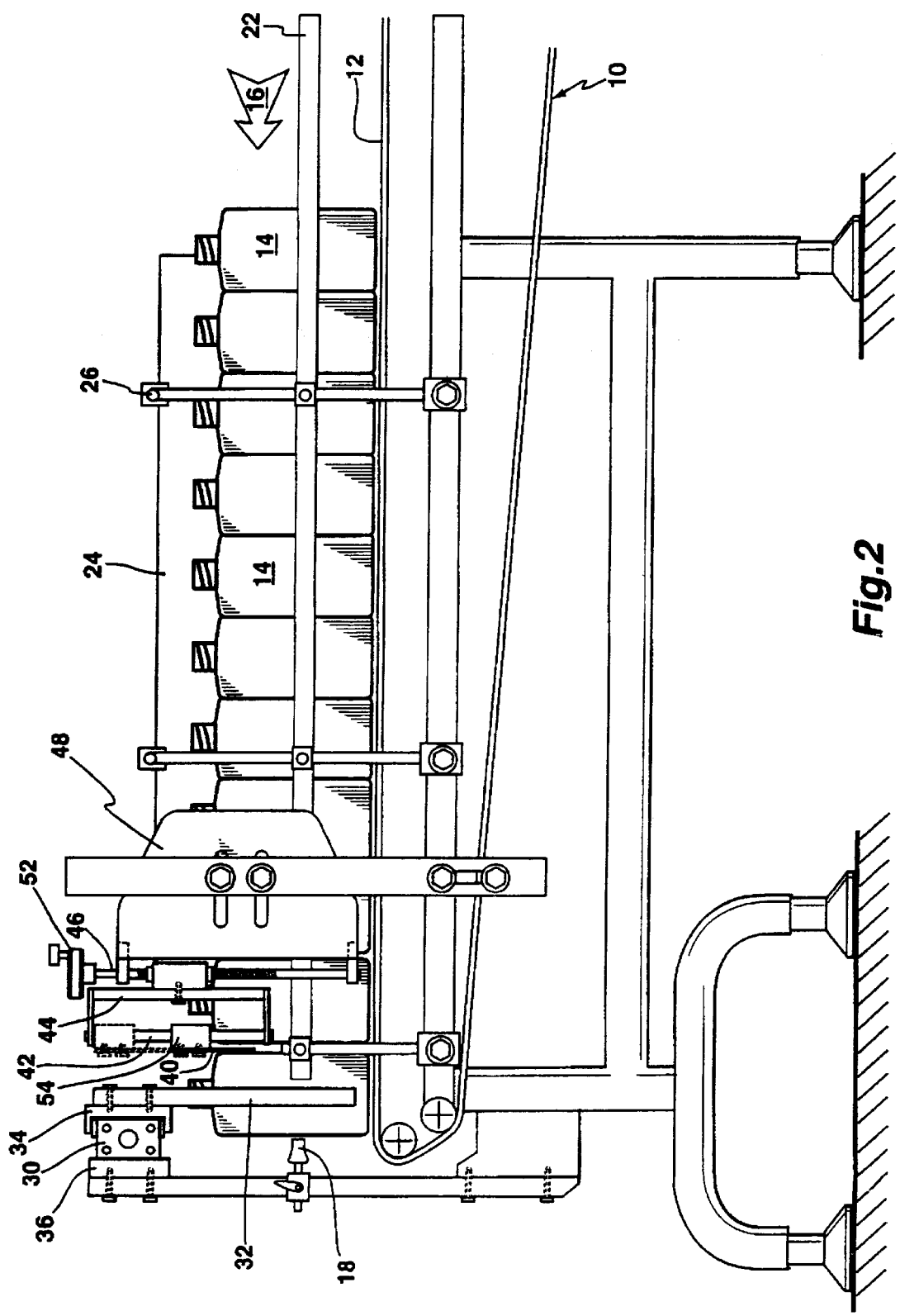
FIG. 2 is a side elevational view of a container feeding system constructed in accordance with the present invention.

With reference to the annexed drawings, more particularly FIGS. 1 and 2, the present invention provides a novel container feeding system designed for supplying empty containers in a serial order to a conveyor belt that will then transport those containers through various processing stations such as a filling station, capping station, labeling station etc. The illustrated container feeding apparatus comprises a conveyor belt 10 defining an upper generally horizontal supporting surface 12 on which a population 14 of empty containers is placed. This population of empty containers defines a multi-row and multi-column arrangement. To this effect, the transverse dimension of the supporting surface 12 is sufficient to accommodate a multitude of empty containers side by side. In the illustrated example, the width of the supporting surface 12 accommodates 5 empty containers. This has been shown for simplicity only. Most preferably, a larger number of containers should be able to fit on the supporting surface 12. In a specific example, the supporting surface 12 should be able to accommodate a number of containers in the range from 20 to 80.

The supporting surface 12 which is constituted by the upper horizontal run of the conveyor belt is advanced forward, along the direction indicated by the arrow 16 in order to displace or at least urge the population of containers 14 in that direction. An abutment wall 18 is placed at the extremity region of the conveyor belt 10. The abutment wall 18 extends transversely to the supporting surface 12, in other words it is generally perpendicular to the direction of movement 16.

In use, when the supporting surface 12 is moved forward, which is accomplished by any suitable drive motor(not shown in the drawings), the population of containers 14 moves up until it engages the abutment wall 18. At this point, no further movement of the body of containers is possible. The supporting surface 12, however, continues to move forward which produces a relative slippage between the surface of the conveyor belt and the bottoms of the individual containers. If containers have a shape conducive to getting entangled with each other, the sequence of displacement of the conveyor belt 10 will be changed as follows: Once no further movement of the containers is possible and the containers of the forwardmost row are lined up by the pressure exerted on them by the population of containers, the conveyor belt 10 of the supporting surface 12 is then stopped and reversed a short distance, enough to relieve the pressure exerted by the population of containers 14 and facilitate the egress of the containers as they are pushed through the outlet passageway 20.

Figure 4:
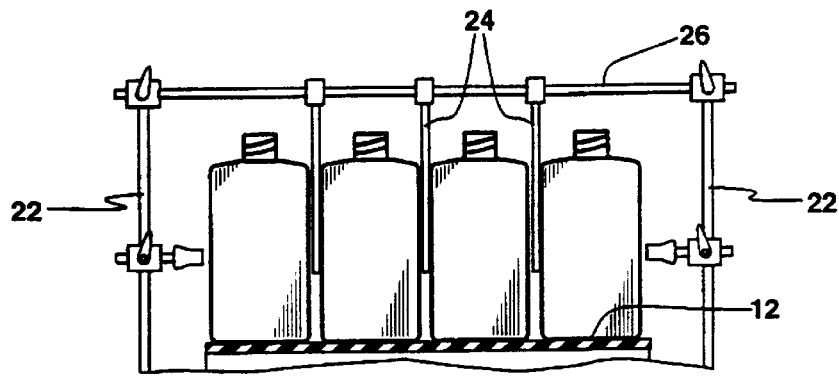
FIG. 4 is a rear elevational view of the adjustable partitions.

When running round containers, and especially glass containers through the apparatus, the containers should be kept in columns in the direction of the displacement of the conveyor belt 10. This avoids breakages, clinging or self-locking effect. To that effect, adjustable partitions 24, as shown in FIGS. 1 and 4, are provided to guide the round containers to the abutment wall 18. Referring to FIG. 4, The adjustable partitions 24 are suspended on rails 26. The rails 26 span perpendicularly across the supporting surface 12 and are seated at each end on the side walls 22. The number of partitions 24 to be installed is dependant on the size of the containers. Small containers require more partitions 24 than larger containers. Partitions 24 may be added on the rails 26 as needed by sliding the new partition 24 onto the rails 26. The rails 26 of these adjustable partitions 24 are, of course easily removable from the side walls 22 since they are simply seated and not rigidly fastened to the side walls 22. These adjustable partitions 24 are used only when containers are fragile or likely to jam.

Figure 3:
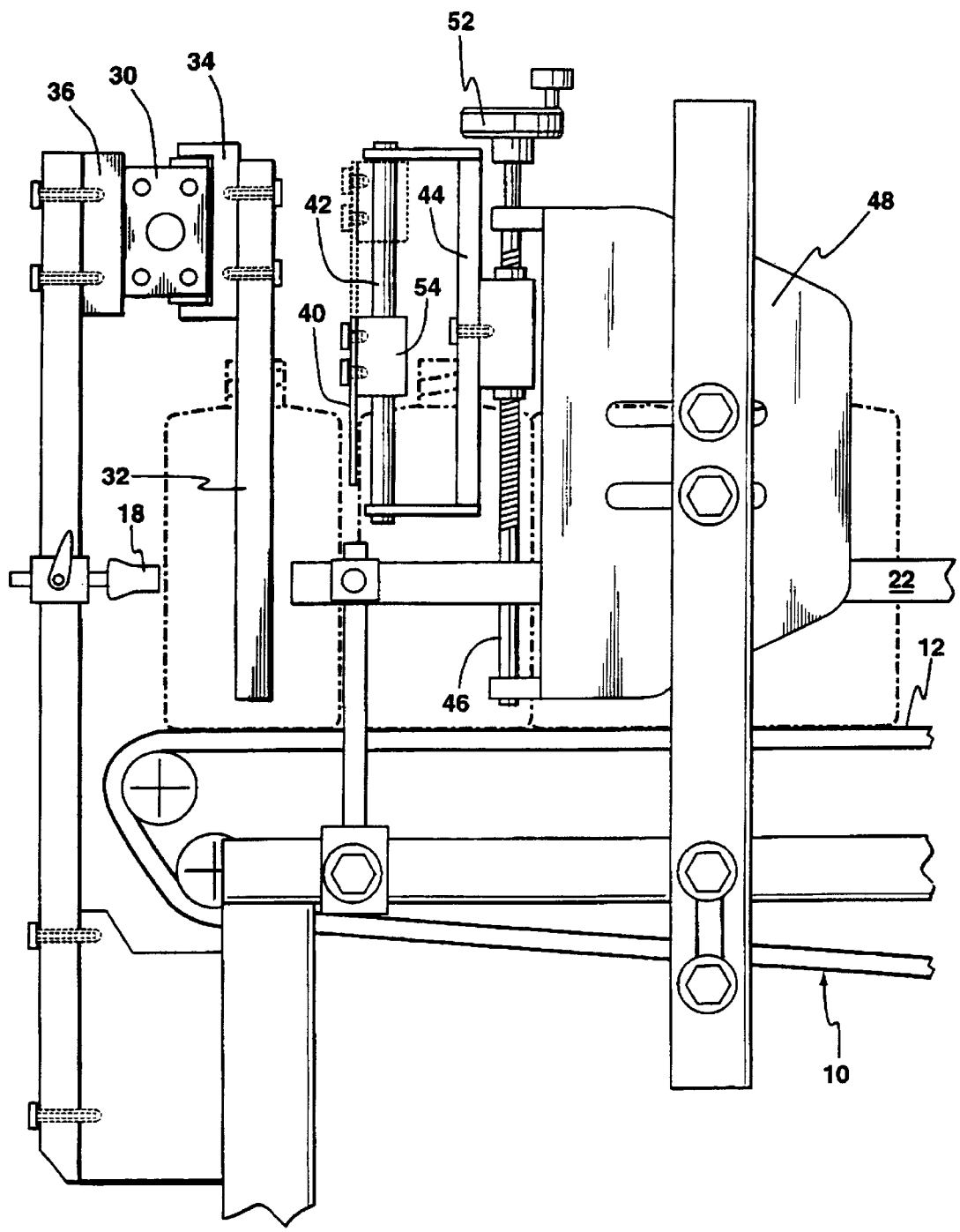
FIG. 3 is a side elevational view of the present invention showing the mechanism of the second abutment wall.

For round containers again, a second abutment wall 40 as shown in FIGS. 2 and 3, is added to keep the containers in straight line and to prevent containers from the adjacent row from interfering with the exiting motion of the forwardmost row as it is being pushed by the pushing member 32. As shown in FIG. 3, The second abutment wall 40 comes down much like a guillotine to separate the rows of round containers and goes up to clear the conveyor supporting surface 12 and let the next row advance to the abutment wall 18. The second abutment wall 40 slides on two rods 42; the rods 42 are mounted on a carriage 44 which is adjustably mounted on two large screws 46 to provide height adjustment for the second abutment wall 40. The two large adjustment screws 46 are themselves mounted to a structure 48 that extends across the supporting surface 12 and itself mounted to the main structure of the feeding apparatus. Adjustment of the height of the second abutment wall 40 is preferably provided by adjustment wheels 52 located above the two large adjustment screws 46 and directly connected to the adjustment screws 46. Turning the adjustment wheels 52 clockwise or counterclockwise rotates the adjustment crews 46 which, in turn, imparts a vertical translatory movement to the carriage 44 thereby raising or lowering the starting position of the second abutment wall 40.

The up and down motion of the second abutment wall 40 is preferably carried out by two pneumatic sliding cylinder 54 that slide up and down on rods 42. The second abutment wall 40 being mounted to these sliding cylinder 54 follows the motion of travel dictated by these sliding cylinder 54. The rods 42 guide the second abutment wall 40 in its travel.

Containers from the population 14 are selectively removed by a piston/cylinder assembly 30 that is mounted above or adjacent to the abutment wall 18. The piston/cylinder assembly 30 comprises a slide table 34, a piston (not shown)and a guide roller 36. The pushing member 32 is attached to the slide table 34. The lateral displacement of the pushing member 32 urges the containers of the forwardmost row through the outlet passageway 20 formed by the abutment wall 18 and a side wall 22 and onto a substantially transverse conveyor 21. In the illustrated example, the conveyor 21 is substantially perpendicular to the supporting surface 12 but the conveyor 21 could be positioned at any angle. For instance, the apparatus would work just as well if the conveyor 21 was positioned parallel to the conveyor 21.

Figure 6:
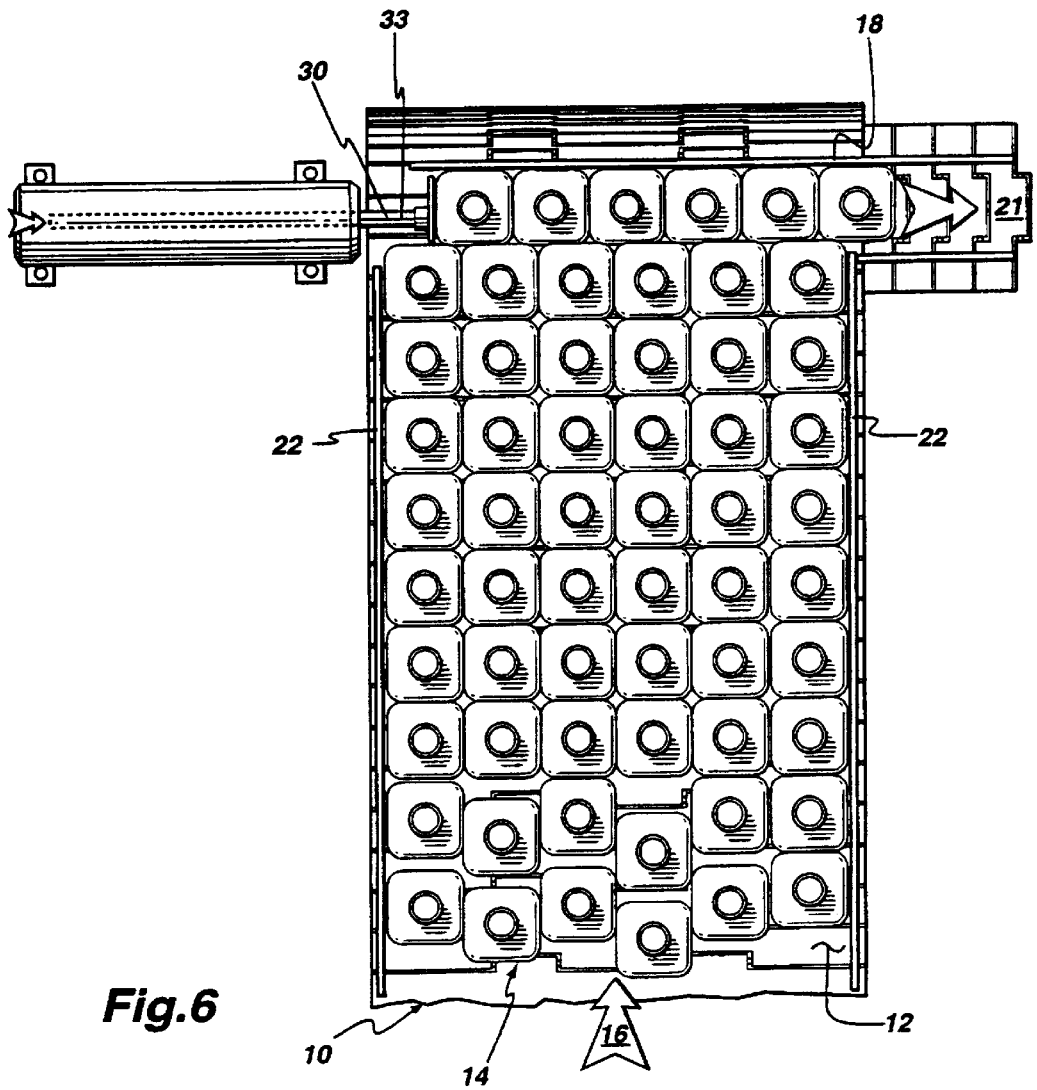
FIG. 6 is a top plan view of a container feeding system constructed in accordance with a variant of the present invention.
Figure 5:
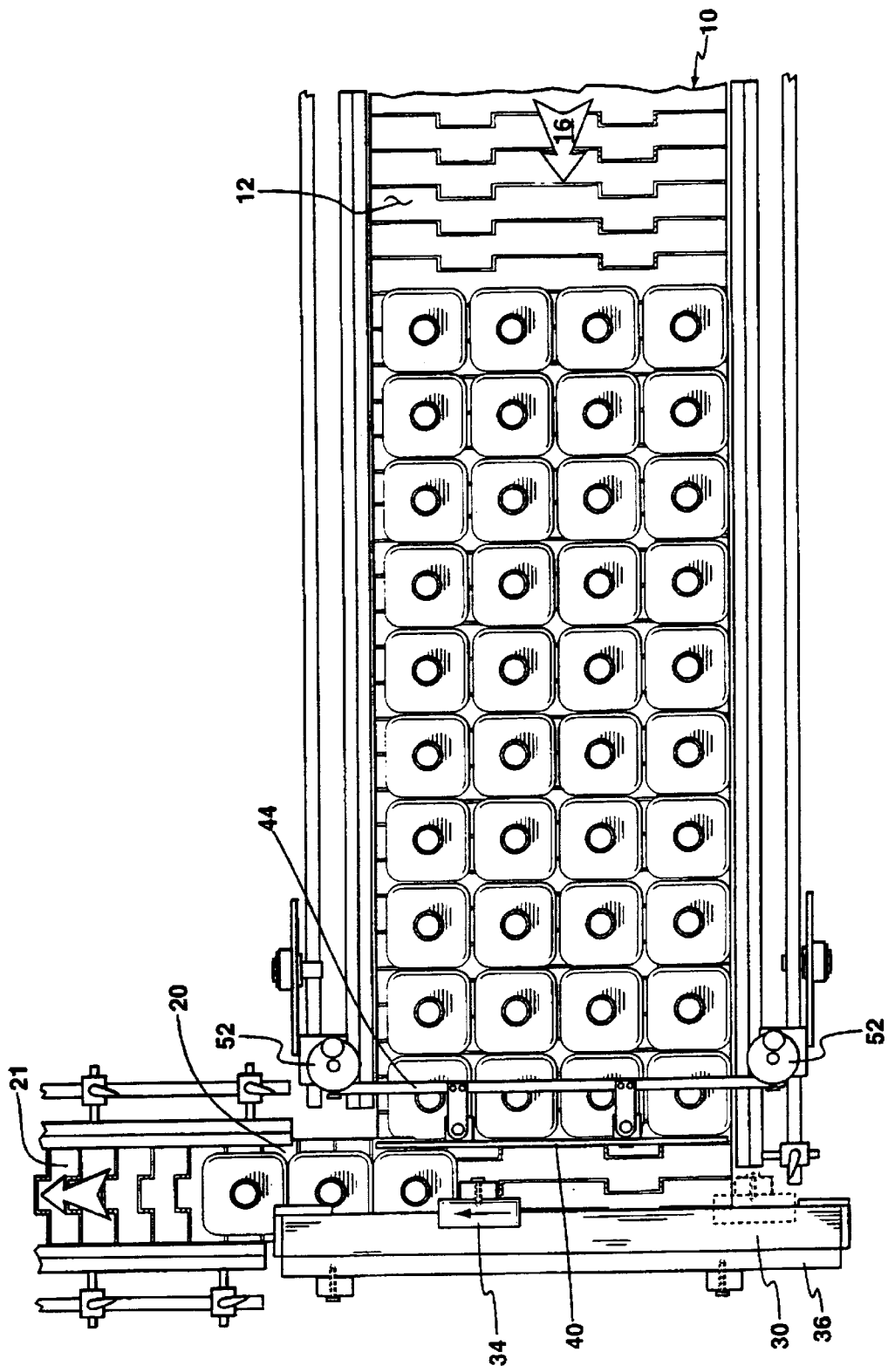
FIG. 5 is a top plan view of a container feeding system constructed in accordance with the present invention handling generally square containers.

In the variant depicted in FIG. 6, the piston/cylinder assembly 30 comprises a piston rod 33. Extension of the piston rod 33 urges the bottles of the row adjacent to the abutment wall 18 through the outlet passageway 20 formed by the abutment wall 18 and a side wall 22 and onto a transverse conveyor 21.

The rate of egress of bottles onto the conveyor 21 can be regulated by the pneumatic piston/cylinder assembly 30. Adjustment of the pneumatic system allows precise control of the speed at which containers are removed from the supporting surface 12.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. An apparatus for feeding containers to a container transporting device, said apparatus including:

a container supporting surface dimensioned to receive and support a population of containers disposed in a multi-column and multi row arrangement, said container supporting surface being movable for displacing said population in a given direction;

an abutment adjacent said container supporting surface, said abutment being engaged by the population of containers when said container supporting surface is moving in said given direction, said abutment being vertically adjustable;

an outlet passageway adjacent said abutment for discharging members of the population of containers;

a container pushing device located in the vicinity of said abutment, said container pushing device being movable substantially along said abutment for engaging at least one member of the population of containers and causing displacement of a row of containers adjacent said abutment toward said outlet passageway.

2. An apparatus for feeding containers to a container transporting device as defined in claim 1, wherein said abutment is a first abutment, said apparatus further comprising a second abutment extending generally across said container supporting surface, said second abutment movable between an at rest position and an operating position, whereby in the operating position said second abutment separates two rows of containers for guiding the row of containers adjacent said first abutment through said outlet passageway, and in said at rest position said second abutment is removed from the containers flow to let a new row of containers through.

3. An apparatus for feeding containers to a container transporting device as defined in claim 2, wherein the position of said second abutment is adjustable.

4. An apparatus for feeding containers to a container transporting device as defined in claim 1, further comprising adjustable partitions extending generally parallel to said container supporting surface, said adjustable partitions being adapted to guide containers in the direction of movement of said container supporting surface whereby preventing containers from jamming and breaking.

5. An apparatus for feeding containers to a container transporting device as defined in claim 1, wherein said container supporting surface is adapted to move in the opposite direction.

6. An apparatus for feeding containers to a container transporting device as defined in claim 1, wherein said container pushing device is a piston/cylinder assembly.

7. An apparatus for feeding containers to a container transporting device as defined in claim 1, wherein said container pushing device comprises a slide table, a guide roller, and a piston.

8. An apparatus for feeding containers to a container transporting device as defined in claim 1, wherein the rate of displacement of said container pushing device and the stroke of said container pushing device are adjustable.

* * * * *